(12) United States Patent
Goel

(10) Patent No.: US 8,514,942 B2
(45) Date of Patent: Aug. 20, 2013

(54) LOW-RESOLUTION VIDEO CODING CONTENT EXTRACTION

(75) Inventor: Anurag Goel, Panchkula (IN)

(73) Assignee: Entropic Communications, Inc., San Diego, CA (US)

( * ) Notice: Subject to any disclaimer, the term of this patent is extended or adjusted under 35 U.S.C. 154(b) by 1103 days.

(21) Appl. No.: 12/346,936

(22) Filed: Dec. 31, 2008

(65) Prior Publication Data

US 2010/0166070 A1 Jul. 1, 2010

(51) Int. Cl.
*H04N 7/12* (2006.01)

(52) U.S. Cl.
USPC .................................................. 375/240.21

(58) Field of Classification Search
USPC .................................................. 375/240.21
See application file for complete search history.

(56) References Cited

U.S. PATENT DOCUMENTS

| | | | | |
|---|---|---|---|---|
| 6,590,938 | B1 * | 7/2003 | Azadegan et al. | 375/240.21 |
| 2004/0151393 | A1 * | 8/2004 | Kurauchi | 382/239 |
| 2007/0058713 | A1 * | 3/2007 | Shen et al. | 375/240.2 |
| 2009/0161762 | A1 * | 6/2009 | Jun et al. | 375/240.16 |

OTHER PUBLICATIONS

Invitation to Pay Additional Fees, dated Aug. 6, 2010, 6 pages, received in corresponding PCT Application No. PCT/IB2009/055918.

Junehwa Song, et al., "Fast Extraction of Spatially Reduced Image Sequences from MPEG-2 Compressed Video," IEEE Transactions on Circuits and Systems for Video Technology, Oct. 1, 1999, pp. 1100-1114, vol. 9, No. 7, IEEE Service Center, Piscataway, New Jersey, USA.

Philippe Salembier, et al., "MPEG-7 Multimedia Description Schemes." IEEE Transactions on Circuits and Systems for Video Technology, Jun. 1, 2001, pp. 748-759, vol. 11, No. 6, IEEE Service Center, Piscataway, New Jersey, USA.

Thomas Wiegand, et al., "Overview of the H.264/AVC Video Coding Standard," IEEE Transactions on Circuits and Systems for Video Technology, Jul. 1, 2003, pp. 560-576, vol. 13, No. 7, IEEE Service Center, Piscataway, New Jersey, USA.

* cited by examiner

*Primary Examiner* — Richard Torrente
(74) *Attorney, Agent, or Firm* — Richard A. Bachand; Bruce Greenhaus; Duane Morris LLP

(57) ABSTRACT

Low complexity method directly decode low-resolution frames from compressed high-resolution videos that were encoded using predictive coding techniques like the H.264 video coding standard. The smaller the decoding resolution, the higher will be the computation and power savings of using the method. Low-frequency coefficients of 2D transformed predictions are added to the low-frequency coefficients of the transformed residual error. Low-frequency coefficients of the reconstructed data are then inverse transformed taking a smaller size transform. Further savings are obtained by reconstructing only those reference pixels that will be needed for accurate decoding of further Intra blocks.

7 Claims, 7 Drawing Sheets

LOW-RESOLUTION VIDEO CODING CONTENT EXTRACTION

FIELD

The embodiments relate generally to methods and devices for efficiently extracting video thumbnails and low-resolution pictures from compressed high-resolution bitstreams coded using H.264 and other video coding standards which are based on predictive compression techniques, and more particularly to the adding of low-frequency coefficients of 2D transformed predictions to the low-frequency coefficients of the transformed residual error, and the low-frequency coefficients of the reconstructed data are then inverse transformed taking a smaller size, and reconstructing only those reference pixels that will be needed for accurate decoding of further Intra blocks.

BACKGROUND

Given the same video quality results, the Video Coding Standard H.264 can compress video files to half the file size as previous video coding standards like MPEG4. The degree of compression depends on how close the predicted data is to the original data to be coded. But Predictive Coding has an overhead because it requires the inclusion of reference data that is needed later to generate the predicted data.

Both the Inter and Intra-frame compression techniques used in Video Coding Standard H.264 are based on predictive coding. It is therefore relatively more complex when compared with video coding standards such as MPEG2, MPEG4, VC-1, etc. Obtaining even low-resolution video frames/video thumbnails from H.264 video files can be very complex, at least when using conventional methods. Nevertheless, being able to decode lower resolution frames from high-resolution compressed video frames is desirable for a lot of reasons.

Conventional ways to decode lower resolution frames from high-resolution compressed video frames include full frame decoding and downscaling, partial frame decoding, and decoding from a hierarchically coded bit-stream. A full resolution image is decoded and then the full resolution decoded image is scaled down to the desired lower resolution. Such scaling usually includes anti-aliasing filtering/averaging and down sampling.

In partial frame decoding, the data in many bitstreams is available in the transform domain, e.g., JPEG, Intra Frame of Video Coding standards such as WMV7, WMV8, WMV9, MPEG1, MPEG2, MPEG4 and H.261, H.263 etc. It is therefore possible to decode low-resolution frames by simply decoding a few, low-frequency coefficients. MPEG4 uses AC and DC prediction in the transformed domain, so the AC and DC prediction is done prior to the decoding of a low-resolution frame. Instead of taking an 8×8 inverse transform, a 1×1, 2×2, or 4×4 inverse transform is taken of the 1×1, 2×2, or 4×4 block located in a larger block, like an 8×8 block.

In hierarchically coded bitstreams, the bitstreams are encoded with both a low-resolution bitstream and a corresponding enhancement layer bitstream. Just the low-resolution bitstreams need to be decoded to get low-resolution images or video. Getting the high-resolution image/video frames includes decoding both the low-resolution and high-resolution bitstreams.

H.264 encodes Intra information differently than do previous video coding standards like MPEG1, MPEG2, MPEG4, H.263, WMV7, WMV8, etc. A prediction for a current block is generated from reference pixels that are in the top and left side of the current block. These reference pixels are already encoded and decoded, and are available for generating the prediction for the current block. The prediction generated is then subtracted from the current block, and a residual error is obtained, e.g., Residual Block=Current Block−Prediction Block. The residual block is transformed, quantized, and the run length symbols generated are entropy coded. The coded residual block and the coded prediction mode are then formatted into a video bitstream.

H.264 uses various block sizes and various prediction modes for coding. H.264 currently uses 16×16, 8×8 and 4×4 block sizes to code the data according to the Intra compression method.

In the coding of the luminance 16×16 Intra prediction mode according to H.264, the data for the current Intra Luminance 16×16 Block is predicted in four ways:

Intra 16×16 luminance Mode 0—Prediction in the Vertical direction;

Intra 16×16 luminance Mode 1—Prediction in the Horizontal direction;

Intra 16×16 luminance Mode 2—DC Prediction; and

Intra 16×16 luminance Mode 3—Plane Prediction.

Reference Pixels at the top and left side are used to code a 16×16 block.

In the coding of Chrominance 8×8 Intra Prediction Mode according to H.264, the data for the current Intra Chrominance 8×8 Block is predicted in four ways:

Intra 8×8 chrominance Mode 0—DC Prediction Mode;

Intra 8×8 chrominance Mode 1—Horizontal Prediction Mode;

Intra 8×8 chrominance Mode 2—Vertical Prediction Mode; and

Intra 8×8 chrominance Mode 3—Plane Prediction.

For the encoding of Luminance Intra 4×4 Blocks, Luminance Intra 4×4 Prediction Mode prediction is generated from the pixels (I to L, M, and A to H) that lie to the immediate left and top of a current block.

TABLE I

| M | A | B | C | D | E | F | G | H |
|---|---|---|---|---|---|---|---|---|
| I | a | B | C | d | | | | |
| J | e | F | G | h | | | | |
| K | i | J | K | l | | | | |
| L | m | N | O | p | | | | |

In Table-I, the sixteen pixels labeled "a" to "p" represent a current 4×4 block to be coded. Pixels I-L, M, and A-H are neighboring reference pixels immediately to the left and above that are used in nine different ways to generate a prediction for the current block along the vertical direction, the horizontal direction, DC, the diagonal down left direction, diagonal down right direction, the vertical right direction, the horizontal down direction, the vertical left direction, and the horizontal up direction.

H.264 uses predictive coding to code the Intra prediction mode of the current Intra block. It uses a flag to indicate whether the predicted mode is to be used or not. If a predicted mode is not used, it sends three extra bits to specify the current prediction mode.

TABLE II

| | B | |
|---|---|---|
| A | C | |
| | | |

In an example represented in Table-II, a block C is a current block to be coded given neighboring blocks A and B. A prediction, "predIntraCxCPredMode" for the Intra prediction mode of current Intra block is generated in the following way:

```
predIntraCxCPredMode = min (intraMxMPredModeA,
intraMxMPredModeB),
  where A and B can be of the same block size as C, or A and B
can have a block size larger than C. For example, A can be of
size 4x4 and B can be of size 8x8.
If (predIntraCxCPredMode == Intra Prediction Mode of current Block)
  Use_Pred_Mode_Flag = 1
Else
  Use_Pred_Mode_Flag = 0.
When, Use_Pred_Mode_Flag is zero, three bits follow it to specify
one of eight remaining prediction modes,
If (CurrentIntraMode < predIntraCxCPredMode)
  RemIntraMode = CurrentIntraMode
Else
  RemIntraMode = CurrentIntraMode −1
```

A typical Set Top Box is an application in which multiple channels are available for decode and display. What is needed is a quick, low power method to allow a user to see snapshots of multiple video bitstreams so they can choose that video to play. But, conventional decoding and display of multiple H.264 video streams would ordinarily be a time and power consuming task.

SUMMARY

In an embodiment, low-resolution video frames/video thumbnails are decoded from compressed high-resolution videos that were encoded using Intra predictive coding techniques like the H.264 video coding standard. Smaller decoding resolutions produce greater computation and power savings using the method. Low resolution frames of non-reference B and P frames are directly reconstructed. An example of non-reference B/P frame is a B/P frame present immediately before an IDR frame. The low-frequency coefficients of 2D transformed predictions are added to the low-frequency coefficients of the transformed residual error. Low-frequency coefficients of the reconstructed data are then inverse transformed taking a smaller size. Further savings are obtained by reconstructing only those reference pixels that will be needed for decoding further Intra blocks.

A system, device, protocol, and method are described. Other embodiments of the system and method are also described.

Other aspects and advantages of the present embodiments will become apparent from the following detailed description, taken in conjunction with the accompanying drawings, illustrating by way of example the principles of the embodiments.

BRIEF DESCRIPTION OF THE DRAWINGS

Throughout the description, similar reference numbers may be used to identify similar elements.

DETAILED DESCRIPTION

In the following description, specific details of various embodiments are provided. However, some embodiments may be practiced with less than all of these specific details. In other instances, certain methods, procedures, components, structures, and/or functions are described in no more detail than is necessary to enable the various embodiments of the embodiments, e.g., for the sake of brevity and clarity.

In general, the embodiments allow users to see a snapshots of multiple video bit-streams so they can choose which video to play. In a typical Set Top Box application, there are multiple channels to simultaneously decode and display to a user trying to make a program selection. The decoding and display of multiple video streams that use predictive coding can be computationally tedious and power consuming, even for the extraction of low-resolution frames. This is because the high-resolution images ordinarily have to be fully decoded before they can be scaled down to lower resolution. The embodiments decode low-resolution frames in relatively less time and with less power consumption, by simplifying some of the decoding steps taken and reducing the transform sizes.

Figure 1:
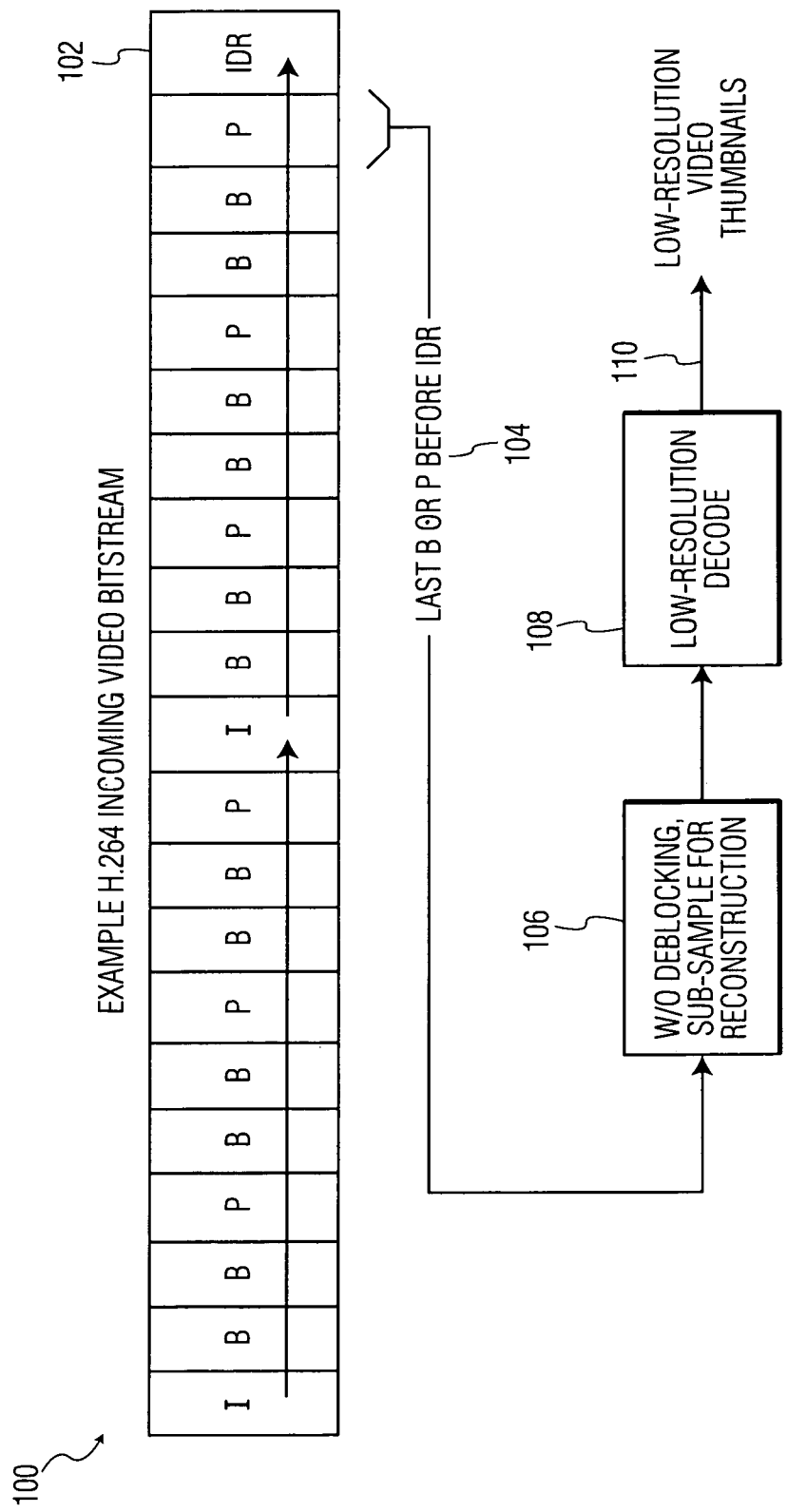
FIG. 1 shows how a video coding standard H.264 compressed video input comprises sequences of I-frames, B-frames, P-frames, and IDR-frames. And how the last P-frame or B-frame just before the IDR-frame is the frame whose low resolution frame is directly reconstructed as a video frame of video thumbnail in the embodiments.

As represented in FIG. 1, an H.264 compressed video bitstream 100 input to a decoder embodiment consists of groups of pictures (GOP) that begin with an Intra-compressed frame (I-frame) followed by a number of Inter-predicted frames (P-frames) from previous I or P frames, and bi-directional predicted frames (B-frames). The I-frames are compressed without reference to other frames. The B-frames require less data than P-frames. The P-frames are predicted based on prior I-frames or P-frames plus the addition of data for changed macroblocks. All the frames needed for the predictions are included in each corresponding GOP.

An Instantaneous Decoding Refresh (IDR) I-frame 102 marks a closed H.264 group of pictures (GOP) by allowing subsequent frames to reference themselves and the frames after it. This resets the decoder completely and guarantees reliable seeking. In H.264, any frames following an IDR frame may not refer back to frames preceding the IDR frame. Non IDR I-frames are, in effect, Intra-coded P-frames. They can be referenced by preceding B-frames.

In FIG. 1, a last frame 104, either a B-frame or a P-frame, before the IDR frame 102 is selected. A sub-sample 106 is taken for reconstruction at a resolution much lower than originally encoded. A low-resolution decoder 108 reconstructs low-resolution video frame/video frame of video thumbnails 110.

H.264 exploits spatial correlation in Intra coded macroblocks with its Intra-prediction techniques. Inputs to this process are the reconstructed macroblocks, the Intra prediction modes of the current macroblock, and the previously decoded neighboring macroblocks. The output is constructed samples taken prior to the de-blocking filter. H.264 normally can apply nine modes of Intra-prediction on 4×4 blocks and 8×8 blocks, and four modes on 16×16 blocks.

H.264 uses modified 4×4 integer DCT to avoid mismatches between the encoders and decoders. The scaling multiplication of transformation is integrated into the quantization process. H.264 further exploits correlation in sixteen DC values of the transformed macroblock by applying a 4×4 Hadamard transform on luminance DC coefficients and a 2×2 Hadamard transform on chrominance DC components. An entropy decoded and inverse zigzag scanned macroblocks output will be inverse quantized and inverse transformed to produce reconstructed macroblocks.

To reduce the blocking artifacts introduced by block-based transforms, inter-predictions, Intra-predictions, and quantization, H.264 includes an adaptive and optional in-loop deblocking filter. Filtering is applied adaptively along the 4×4 block edges. The inputs to the filter are completely reconstructed macroblocks, boundary strength, and quantization parameters. The filter outputs are the final reconstructed macroblocks.

Figure 2:
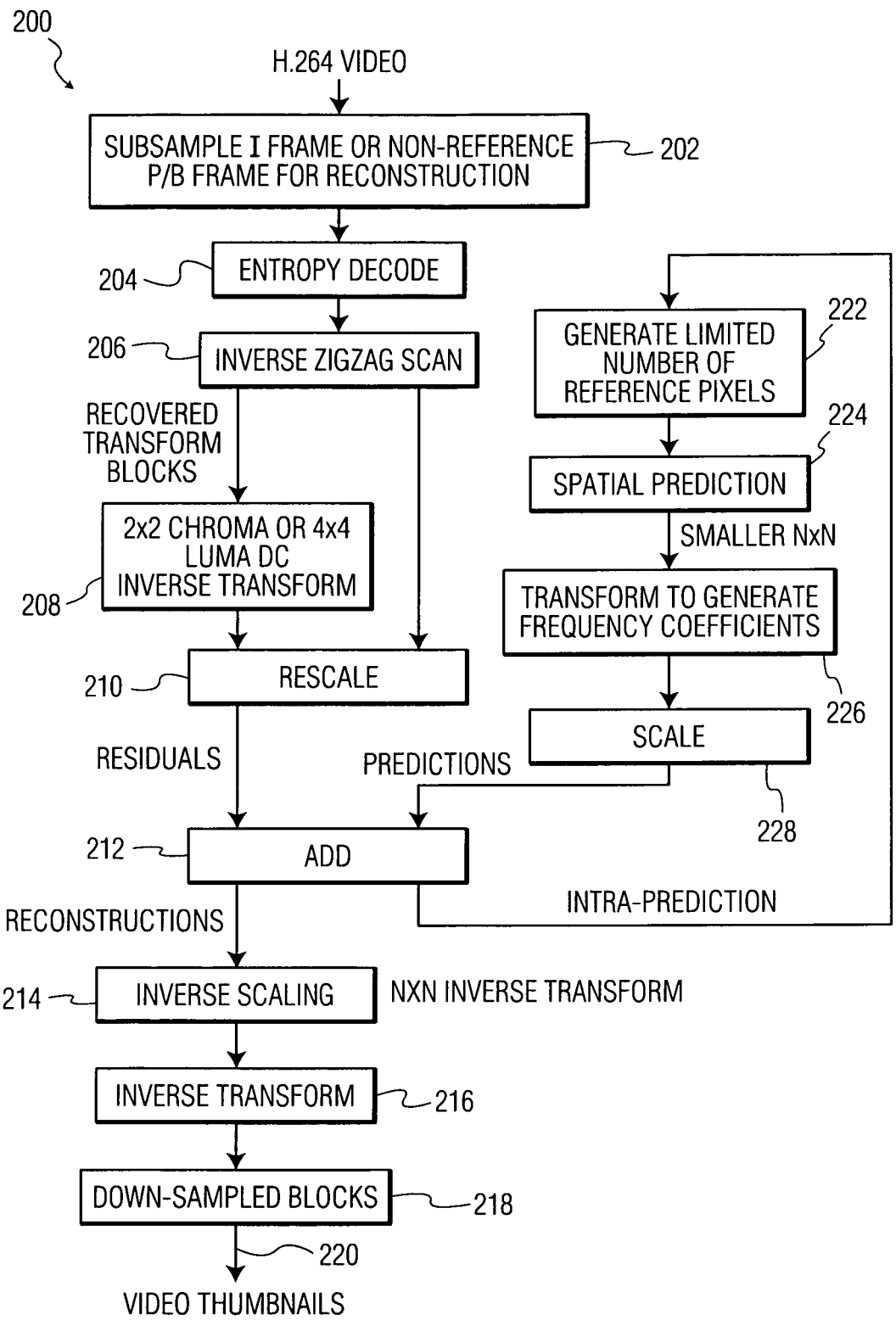
FIG. 2 shows a method embodiment for extracting low resolution video frames/video frames of video thumbnails from H.264 video bitstreams.

FIG. 2 represents a decoder method embodiment 200 for extracting low-resolution video frames/video frames of video thumbnails from a high-resolution video input 202 that was compressed with the H.264 video coding standard. It would also work with other similar type video compression that uses predictive coding. In method 200, Low resolution non-reference B and P frames are directly reconstructed. An example of non-reference B/P frame is a B/P frame present immediately before an IDR frame. These P-frames and B-frames do not require de-blocking, because at these resolutions the human eye will do the averaging and blocking, making any artifacts not visible. I Frame or Non-reference P/B frames are provided to an input 202.

A step 204 does entropy decoding according to the H.264 video coding standard. Entropy encoding is used to store large amounts of data by examining the frequency of patterns within it and encoding this in another, smaller form. A step 206 does an inverse zigzag scan order to form a block of quantized transformed residuals.

Part of this output is provided to a step 208 that does either a 2×2 or 4×4 inverse transform on the DC coefficients of the Intra-8×8 chrominance or Intra-16×16 luminance blocks only which are coded using Intra-8×8 chrominance or Intra-16×16 luminance Prediction modes. This output, and another part of the output of step 206 are input to a step 210 of Re-scaling. Re-scaling is a combination of prescaling and inverse quantization operations. Prescaling is an scaling operation which is a part of Modified Integer IDCT.

In step 210, the quantized transform coefficients are re-scaled. Each coefficient is multiplied by an integer value to restore its original scale.

A step 212 adds the transformed residuals to the corresponding transformed predictions, and outputs transformed reconstructed macroblocks. The decoder adds the transformed prediction to the transformed decoded residual to reconstruct a transformed decoded downsampled macroblock which will become a part of low resolution video frame/video frame of a video thumbnail.

The reconstructed macroblocks are inverse scaled in a step 214 for normalization. An inverse transform combines the standard basis patterns, weighted by the re-scaled coefficients, to re-create each block. A step 216 applies an (n×n) inverse transform on the reduced size (n×n), thus saving the computational expense of doing an inverse transform on a much larger size. A down-sampled and low-resolution block is finalized in a step 218 and sent in a video thumbnail stream to an output 220.

The predictions used in step 212 are formed from the currently decoded frames and previously decoded frames. A step 222 generates Intra prediction reference pixels which are only the bottom and/or right edges of a block.

A step 224 provides for spatial prediction according to the H.264 video coding standard. Spatial prediction is used for Inter Prediction. Spatial prediction is also used for Intra block coding. Ordinarily, luminance Intra prediction may be based on a 4×4 block, for which there are nine prediction modes, or a 16×16 macroblock, for which there are four prediction modes. For chrominance Intra prediction, there are also four prediction modes. Lack of availability of top and/or left reference pixels reduce the number of prediction modes employed to produce the video thumbnails, and limit the ones employable to those that are computationally the simplest and most straightforward.

A step 226 generates few frequency coefficients, (n×n) size, from the spatial predictions using an N×N transform. A step 228 scales the resulting predictions for use in step 212.

Low complexity method embodiments directly decode low-resolution frames from compressed high-resolution videos that were encoded using Intra predictive coding techniques like the H.264 video coding standard. The smaller the decoding resolution is, the higher will be the computation and power savings of using the method. Low-frequency coefficients of 2D transformed predictions are added to the low-frequency coefficients of the transformed residual error. Low-frequency coefficients of the reconstructed data are then inverse transformed taking a smaller size. Further savings are obtained by reconstructing only those reference pixels that will be needed for accurate decoding of subsequent Intra blocks.

Figure 3:
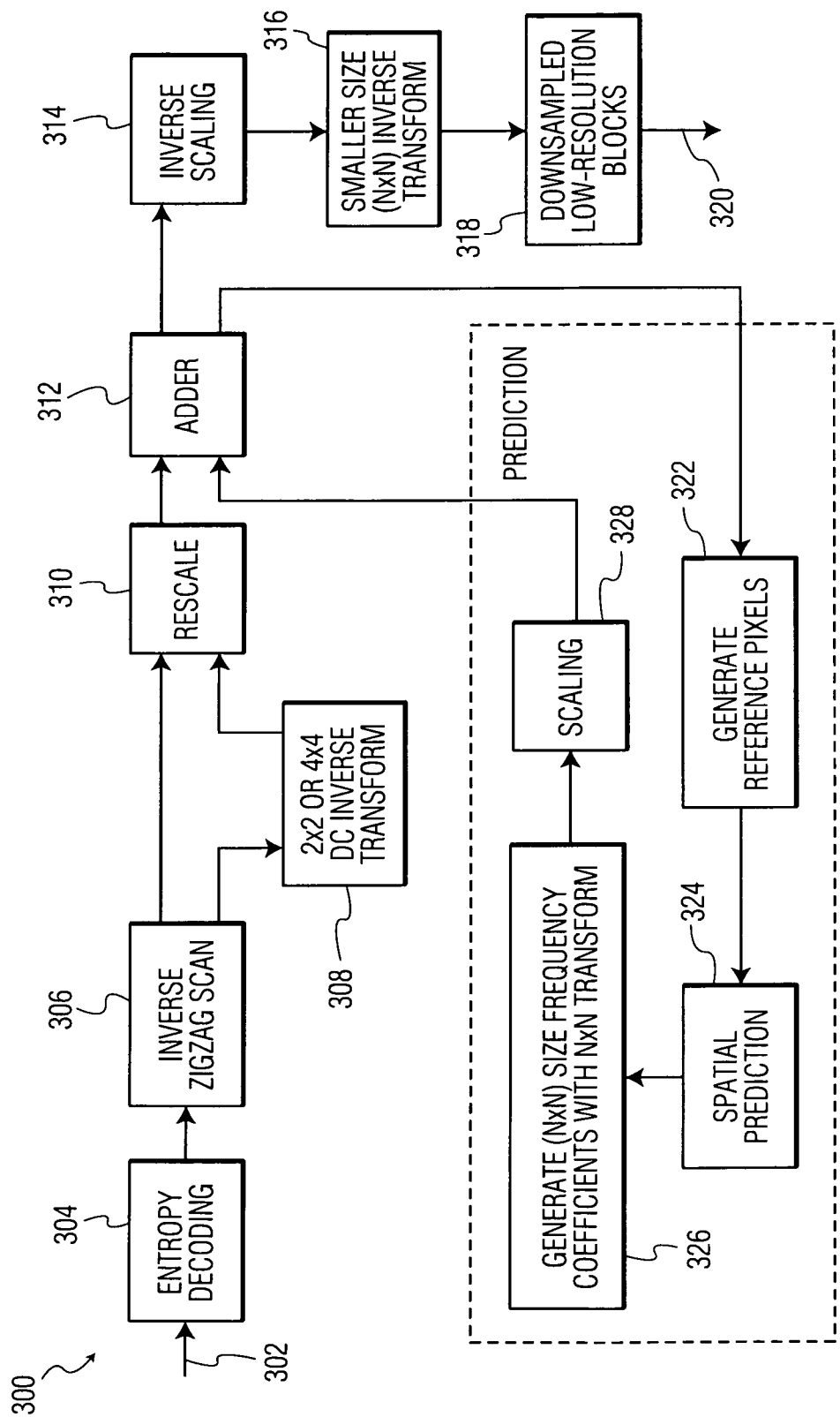
FIG. 3 shows a decoder for extracting low resolution video frames/video frames of video thumbnails from H.264 video bitstreams.

FIG. 3 represents a low-resolution video frame/video thumbnail decoder 300 with an input 302 to receive a highly compressed video like H.264. The video thumbnail decoder 300 could be built as a field programmable gate array (FPGA) or an application specific integrated circuit (ASIC). An entropy decoder 304 is connected to an inverse zigzag scan 306. Part of the output is directed to an inverse transform unit 308, and the other part to a re-scaling unit 310. Re-scaling is a combination of prescaling and inverse quantization operations. Prescaling is an scaling operation which is a part of Modified Integer IDCT. An adder 312 combines the transformed residual frames to the transformed predicted frames to produce transformed low resolution reconstructed frames. An inverse scaler 314 normalizes the frames for a smaller size inverse transform unit 316. Down-sampled low resolution blocks 318 are then produced for a video thumbnail output 320. The predictions take some of the reconstructions to generate reference pixels in a unit 322. A spatial prediction unit 324 generates prediction data for reconstructing a frame. An N×N transform 326 generates few of the frequency coefficients for a scaling unit 328.

Decoder 300 decodes single or multiple input streams into one or more corresponding low-resolution outputs. The H.264 video coding standard uses the 4×4 Integer transform for coding the Inter and Intra residual errors. So in order to decode the low-resolution frames, down-sampling by four in each direction is used to produce one sample for each 4×4 block. One 2D DC coefficient is therefore needed per 4×4 block.

In the decoder 300, the non-reference P/B frames, e.g., last P-frame or B-frame just before the IDR frame, is directly sub-sampled for reconstruction. These P-frames and B-frames do not require de-blocking, because at these resolutions the human eye will do the averaging and blocking, making any artifacts not visible.

Intra block down-sampling is by four. H.264 uses the 4×4 integer transform for coding Inter and Intra residual errors. Downsampling by four in each direction requires generation of one sample per 4×4 block, i.e., one 2D DC coefficient per 4×4 block. The compressed 4×4 block goes through entropy decoding, inverse zigzag and inverse quantization. After entropy decoding, inverse quantization is done, without a pre-scaling operation. The 4×4 blocks are down-sampled by four by adding 2D DC coefficients of the transformed prediction to the 2D DC coefficients of the residual error.

---

Reconstructed DC coefficient = Reconstructed 2D DC coefficient of residual error + DC Coefficient of 2D Transformed Prediction.
Down-sampled Image pixel = Reconstructed DC coefficient/normalization_factor
Normalization_factor = 4 for H.264

---

These down-sampled image pixels form an image with a down-sampling factor of four. The DC coefficients of the transformed prediction are calculated in an efficient way for various prediction modes and various block sizes.

In the Intra block down-sampling by two, only the 2×2 low-frequency coefficients of a 4×4 block are needed. In the operations involved in down-sampling by two small errors may get introduced because of the approximations being used. These errors are acceptable because of the way the results are being used in thumbnails. In pseudocode, this could be represented by,

---

For Intra block down-sampling by two, a 2-point 2D inverse transform is used.

$$D = \begin{bmatrix} 1 & 1 \\ 1 & -1 \end{bmatrix}$$

x = normalization_factor1 * D X D'
normalization_factor1 = 1/normalization_factor*N2*N2, where N2 = 2 for 2 × 2 transform
normalization factor: This is a normalization factor that depends on other pre or post operations.
X: 2 × 2 low-frequency coefficients of 2D transformed image data.
P: 2 × 2 low-frequency coefficients of 2D Transformed Prediction
RE: 2 × 2 low-frequency coefficients of 2D Transformed Residual Error
X = P + RE
The Horizontal Prediction comprises:

2D_Transformed_Prediction_DC of a 4 × 4 block = 4*(J1 + J2 + J3 + J4)/N;
2D_Transformed_Prediction_DC of blocks B1, B2, B3 and B4 of a 16 × 16 block = 4*(J1 + J2 + J3 + J4)/N;
2D_Transformed_Prediction_DC of blocks B5, B6, B7 and B8 of a 16 × 16 block = 4*(J5 + J6 + J7 + J8)/N;
2D_Transformed_Prediction_DC of blocks B9, B10, B11 and B12 of a 16 × 16 block = 4*(J9 + J10 + J11 + J12)/N; and
2D_Transformed_Prediction_DC of blocks B13, B14, B15 and B16 of a 16 × 16 block = 4*(J13 + J14 + J15 + J16)/N;
where, N = 4, according to 4 × 4 transform used in H.264 standard.

---

The locations of pixels J1 to J16 and K1 to K16 used as reference pixels are diagrammed in the following Tables.

| D0 | K1 | K2 | K3 | K4 |
|----|----|----|----|----|
| J1 |    |    |    |    |
| J2 |    |    |    |    |
| J3 |    |    |    |    |
| J4 |    |    |    |    |

| H0  | K1 | K2 | K3 | K4 | K5 | K6 | K7 | K8 | K9 | K10 | K11 | K12 | K13 | K14 | K15 | K16 |
|-----|----|----|----|----|----|----|----|----|----|-----|-----|-----|-----|-----|-----|-----|
| J1  |    |    |    |    |    |    |    |    |    |     |     |     |     |     |     |     |
| J2  |    |    |    |    |    |    |    |    |    |     |     |     |     |     |     |     |
| J3  |    |    |    |    |    |    |    |    |    |     |     |     |     |     |     |     |
| J4  |    |    |    |    |    |    |    |    |    |     |     |     |     |     |     |     |
| J5  |    |    |    |    |    |    |    |    |    |     |     |     |     |     |     |     |
| J6  |    |    |    |    |    |    |    |    |    |     |     |     |     |     |     |     |
| J7  |    |    |    |    |    |    |    |    |    |     |     |     |     |     |     |     |
| J8  |    |    |    |    |    |    |    |    |    |     |     |     |     |     |     |     |
| J9  |    |    |    |    |    |    |    |    |    |     |     |     |     |     |     |     |
| J10 |    |    |    |    |    |    |    |    |    |     |     |     |     |     |     |     |
| J11 |    |    |    |    |    |    |    |    |    |     |     |     |     |     |     |     |
| J12 |    |    |    |    |    |    |    |    |    |     |     |     |     |     |     |     |
| J13 |    |    |    |    |    |    |    |    |    |     |     |     |     |     |     |     |
| J14 |    |    |    |    |    |    |    |    |    |     |     |     |     |     |     |     |
| J15 |    |    |    |    |    |    |    |    |    |     |     |     |     |     |     |     |
| J16 |    |    |    |    |    |    |    |    |    |     |     |     |     |     |     |     |

In the horizontal prediction, the 2D transform of horizontal prediction is taken according to H.264. For down-sampling by two, only the 2×2 low-frequency coefficients are needed. A first step is to take the horizontal transform. Since the data is the same along the horizontal direction, only the DC coefficient will have a non-zero value. The DC coefficient can be calculated by adding the elements of the rows. After the horizontal transform, only the first column will have non-zero elements. The vertical transform of only the first column is taken. Only the first two coefficients of the first column are calculated. The calculation for the 2D transform of horizontal prediction is therefore very simple and efficient.

Only the first two coefficients of the first column are multiplied with the corresponding post scaling coefficients ¼ and $$\frac{1}{2\sqrt{10}}.$$

Such post scaling coefficients are in accordance with the H.264 video coding standard.

Pre-scaling is not needed before taking the 2D inverse transform in unit 310.

In pseudocode, this could be represented by, $$P = \begin{bmatrix} \frac{F1}{4} & 0 \\ \frac{F2}{2\sqrt{10}} & 0 \end{bmatrix}$$

X = P + RE
x = (1/(normalization_factor*N2*N2)) * D X D'
According to H.264 video coding standard, normalization_factor = N4;
    where N4 = 4, if the 2D transform of prediction is a 4 × 4 transform.
The Vertical Prediction comprises:

2D_Transformed_Prediction_DC of a 4 × 4 block =
    4*(K1 + K2 + K3 + K4)/N;
2D_Transformed_Prediction_DC of blocks B1, B5, B9 and B13 of a
    16 × 16 block = 4*(K1 + K2 + K3 + K4)/N;
2D_Transformed_Prediction_DC of blocks B2, B6, B10 and B14 of a
    16 × 16 block = 4*(K5 + K6 + K7 + K8)/N;
2D_Transformed_Prediction_DC of blocks B3, B7, B11 and B15 of a
    16 × 16 block = 4*(K9 + K10 + K11 + K12)/N; and
2D_Transformed_Prediction_DC of blocks B4, B8, B12 and B16 of a
    16 × 16 block = 4*(K13 + K14 + K15 + K16)/N;
where, N = 4, according to 4 × 4 transform used in H.264 standard.

For the vertical prediction, the 2D transform of vertical prediction is taken according to H.264. For down-sampling by two, only the 2×2 low-frequency coefficients of vertical prediction are generated.

First, the vertical transform is taken. The data is the same along the vertical direction, so only the DC coefficients will have non-zero values. The DC coefficients are easily calculated by adding the elements of columns. After the vertical transform, only the first row will have non-zero elements. The horizontal transform of only the first row must be taken, and only the first two coefficients of the first row need to be calculated. The 2D transform of vertical prediction is thus calculated in an efficient way.

Then, only the first two coefficients of the first row are multiplied with the corresponding post scaling coefficients ¼ and $$\frac{1}{2\sqrt{10}}.$$

These post scaling coefficients comply with the H.264 video coding standard.

After entropy decoding, inverse quantization is done without a pre-scaling operation. In pseudocode, this could be represented by, $$P = \begin{bmatrix} \frac{F1}{4} & \frac{F2}{2\sqrt{10}} \\ 0 & 0 \end{bmatrix}$$

X = P + RE
x = (1/(normalization_factor*N2*N2)) * D X D'
According to the H.264 video coding standard, the normalization_factor = N4; and N4 = 4, when the 2D transform of prediction is a 4 × 4 transform.
The DC Prediction comprises:

2D_Transformed_Prediction_DC of all 4 × 4 blocks = 16 *
    Mean_Prediction_Value/N
where, N = 4 according to 4 × 4 transform used in H.264 standard.

In the DC Prediction, the 2D transform of the DC prediction is taken according to H.264. For down-sampling by two, only the 2×2 low-frequency coefficients of the DC Prediction need to be generated.

Since the data along the horizontal direction is the same as along the vertical direction, only the 2D DC coefficient will have non-zero value and we can straight away calculate the 2D DC coefficient by adding the elements of the 4×4 matrix. The 2D transform of DC prediction is efficiently calculated.

Only the 2D DC coefficient is multiplied with the corresponding post scaling coefficients ¼. This post scaling coefficient is in accordance with H.264 video coding standard. In pseudocode, this could be represented by, $$P = \begin{bmatrix} \frac{F1}{4} & 0 \\ 0 & 0 \end{bmatrix}$$

X = P + RE
x = (1/(normalization_factor*N2*N2)) * D X D'
According to the H.264 video coding standard, normalization_factor = N4; and N4 = 4, if the 2D transform of prediction is a 4 × 4 transform.
F1 = 16 * Mean_Prediction_Value $$2D\_Transformed\_DC\_Prediction = \begin{bmatrix} \frac{F1}{4} & 0 & 0 & 0 \\ 0 & 0 & 0 & 0 \\ 0 & 0 & 0 & 0 \\ 0 & 0 & 0 & 0 \end{bmatrix}$$

The Plane Prediction comprises

2D_Transformed_Prediction_DC for each 4 × 4 block = Sum of all
    plane predicted values within each 4 × 4 block/N
where, N = 4 according to 4 × 4 transform used in H.264 standard.

The 2D transform of Plane prediction is taken according to H.264. For down-sampling by two, just the 2×2 low-frequency coefficients are needed, so only the 2×2 low-frequency coefficients of Plane Prediction are generated.

The first two coefficients in the vertical transform are calculated for each column. After the vertical transform, the horizontal transform of only the first two rows is taken, only the 2×2 low-frequency coefficients need to be calculated. Only the first two coefficients of each horizontal transform are calculated for a transform. In this way, the 2D transform of plane prediction is calculated in an efficient way.

The first four coefficients of the first row are multiplied with the corresponding post scaling coefficients ¼, $$\frac{1}{2\sqrt{10}}, \frac{1}{2\sqrt{10}},$$

¼, in accordance with the H.264 video coding standard.

The 2D inverse transform is taken without the pre-scaling. In pseudocode, this could be represented by, $$P = \begin{bmatrix} \frac{F1}{4} & \frac{F2}{2\sqrt{10}} \\ \frac{F3}{2\sqrt{10}} & \frac{F4}{4} \end{bmatrix}$$

X = P + RE
x = (1/(normalization_factor*N2*N2)) * D X D'
According to H.264 video coding standard, normalization_factor = N4;
where N4 = 4, if the 2D transform of prediction is a 4 × 4 transform.
The 4 × 4 Directional Prediction Modes:

2D_Transformed_Prediction_DC for each 4 × 4 block = Sum of all predicted values within each 4 × 4 block/N
where, N = 4 according to 4 × 4 transform used in H.264 standard.

The 2D transform of the directional prediction, those other than horizontal, vertical and DC, is taken according to H.264. For down-sampling by two, only the 2×2 low-frequency coefficients are needed to generate the 2×2 low-frequency coefficients of directional prediction.

The first two coefficients in the vertical transform are calculated for each column. After vertical transform, the horizontal transform of only first two rows are taken because only the 2×2 low-frequency coefficients are needed. Only the first two coefficients of each horizontal transform are calculated to be able to take the 2×2 transform. The 2D transform of the plane prediction is simple and efficient.

Only the first four coefficients of the first row are multiplied with the corresponding post scaling coefficients ¼, $$\frac{1}{2\sqrt{10}}, \frac{1}{2\sqrt{10}},$$

¼. These post scaling coefficients are according to the H.264 video coding standard.

In pseudocode, this could be represented by, $$P = \begin{bmatrix} \frac{F1}{4} & \frac{F2}{2\sqrt{10}} \\ \frac{F3}{2\sqrt{10}} & \frac{F4}{4} \end{bmatrix}$$

X = P + RE
x = (1/(normalization_factor*N2*N2)) * D X D'
According to H.264 video coding standard, normalization_factor = N4;
where N4 = 4, if the 2D transform of prediction is a 4 × 4 transform.

The decoded DC coefficients are combined together to produce the down-sampled image frame, e.g., with a down-sampling factor of greater than four.

A reconstruction of the reference pixels is needed for decoding future intra blocks. The prediction modes for all of the 4×4 blocks of a 16×16 or 8×8 block are present before the encoded residual error. So, which pixels of a particular 4×4 block that will act as reference pixels is known. Here, only the reference pixels that are needed will be generated. If a block to be decoded needs only the top or left reference pixels, then only one or the other are decoded and reconstructed. If it requires both the top and left reference pixels to be available, then both are decoded and reconstructed. Video coding standards allow the Prediction modes of entire frame to be stored together and the residual error of entire frame is stored together separately, this is generally known as "Data Partitioning". Data Partitioning allows greater savings as we can know before hand which particular reference pixels are required for decoding future Macroblocks and only the required reference pixels are reconstructed.

For the luminance 16×16 blocks, the H.264 video coding standard uses reference pixels from blocks T1, T2, T3, T4, L1, L2, L3 and L4, to compress a 16×16 block. The 16×16 block is encoded by splitting it into sixteen 4×4 blocks (B1 to B16), and then each 4×4 block is coded individually.

TABLE III

| D1 | T1 | T2 | T3 | T4 | |
|----|----|----|----|----|----|
| L1 | B1 | B2 | B3 | B4 | |
| L2 | B5 | B6 | B7 | B8 | B16x16_1 |
| L3 | B9 | B10 | B11 | B12 | |
| L4 | B13 | B14 | B15 | B16 | |
| | | | B16x16_2 | | |

The 4×4 blocks B1, B2, B3, B5, B6, B7, B9, B10 and B11, lack the reference data that will be needed by the Intra blocks on the right and bottom Macroblock edges. The pixels in the farthest right column, and the bottom row of these 4×4 blocks are not reconstructed, hence resulting in computation savings. The down-sampling operation for these blocks requires decoding only the low-frequency coefficients, e.g., the 1×1 or 2×2 block located at the top left corner of each 4×4 block. The reference pixels in the far right column and bottom row of the 4×4 block needed for future blocks are generated only in blocks B13, B14, B15, B16, B4, B8, and B12.

If the right/bottom blocks need only the left or top reference pixels, then only those reference pixels are decoded and reconstructed. If right/bottom blocks need both top and left reference pixels to be available, then both the top and left reference pixels are decoded and reconstructed. The Intra blocks for chrominance are 8×8 blocks.

TABLE IV

| D1 | T1 | T2 |
|---|---|---|
| L1 | C1 | C2 |
| L2 | C3 | C4 |

The 4×4 blocks C1 do not include the reference data that will be needed by the right and bottom 8×8 chrominance blocks. The pixels on the right most column and bottom most row of this 4×4 block do not need to be generated, hence resulting in computation savings. The down-sampling operation for these blocks requires decoding only the low-frequency coefficients, e.g., 1×1 or 2×2 block located at the top and left side corner of each 4×4 block. The reference pixels needed for future blocks on the right column and bottom row of the 4×4 block are generated only in blocks C2, C3 and C4.

If the right/bottom blocks require only the left or top reference pixels, then only those top or left reference pixels are decoded and reconstructed. If both top and left reference pixels are required to be available, then both are decoded and reconstructed.

In Table-V, E1 represents a luminance 8×8 block. The others, D1, T1, T2, T3, T4, L1 and L2 are 4×4 blocks that include the reference data needed to generate E1.

TABLE V

| D1 | T1 | T2 | T3 | T4 |
|---|---|---|---|---|
| L1 | E1 | | | |
| L2 | | | | |

The down-sampling operation for this 8×8 block requires decoding only the low-frequency coefficients, e.g., the 2×1 or 2×2 blocks located in the top left corner of the 8×8 block. Then the reference pixels needed for future blocks are generated in the far right column and bottom row of the 8×8 block.

If the right/bottom blocks require only left or top reference pixels, then only their top or left reference pixels are decoded and reconstructed. If it requires both top and left reference pixels to be available, then both top and left reference pixels are decoded and reconstructed.

Reconstructing the Inter frame includes decoding the residual error with entropy decoding, inverse zigzag scan, inverse quantization, and inverse transform. Then, the motion vector is used to select a reference region from the reference frame. A prediction can then be generated from the reference region, and it is added to the decoded residual error. The prior art reconstructs a full resolution Inter frame, and then down-samples it using a downsampling filter.

In comparison, the embodiments disclosed herein generate a down-sampled frame directly. A small number of the frequency coefficients of prediction obtained from the reference frame are generated. These few frequency coefficients are generated using N×N transform, e.g., 8×8. These frequency coefficients are small (1×1, 2×2) in number, as compared to the original number (8×8) of frequency coefficients. Frequency coefficients of the prediction are added to the corresponding frequency coefficients of the reconstructed residual error. The inverse transform (1×1 or 2×2) is taken of these few frequency coefficients (1×1 or 2×2). The inverse transformed result is then normalized. Normalized down-sampled blocks together form a down-sampled image.

If the generated down-sampled frame is to be used as a down-sampled reference frame, then the reference DC coefficient for the next frame is generated from the down-sampled frame by weighted average of four reference DC coefficients. The DC coefficient of the reference block of the next frame is within the region covered by these four reference DC coefficients. Using the down-sampled frames as reference frames will introduce drift errors, a mismatch between the decoded frames on encoder and decoder sides. Such drift errors can either be tolerated, or their visual impact can be mitigated by post-processing techniques.

Table-VI illustrates an example of a slice group with maximum error robustness and the embodiments yield maximum computation savings. H.264 has specified a few explicit Slice Groups, and it allows custom slices. Macroblocks can be chosen in random, and then assigned to two slice groups. However, users must provide maps of the Macro block in the Slice Group to the Macro block in the frame.

TABLE VI

| SGI | SGII | SGI | SGII | SGI | SGII | SGI | SGII |
|---|---|---|---|---|---|---|---|
| SGII | SGI | SGII | SGI | SGII | SGI | SGII | SGI |
| SGI | SGII | SGI | SGII | SGI | SGII | SGI | SGII |
| SGII | SGI | SGII | SGI | SGII | SGI | SGII | SGI |
| SGI | SGII | SGI | SGII | SGI | SGII | SGI | SGII |
| SGII | SGI | SGII | SGI | SGII | SGI | SGII | SGI |
| SGI | SGII | SGI | SGII | SGI | SGII | SGI | SGII |
| SGII | SGI | SGII | SGI | SGII | SGI | SGII | SGI |

TABLE VII

Table-VII represents another example of Slice Groups and Slices. One slice group is split in to two slices (S1 & S2) and another has been split in to two slices (S4, S5 & S6).

Video thumbnails are generally preferred over static image thumbnails. A video thumbnail will provide better insights into what the parent video includes. DVDs, video archives, and video directories are better represented by video thumbnails, as compared to a static thumbnail image. Video thumbnail, low-resolution content can be extracted on demand from the user, for example, action scenes, etc.

Low-resolution content can be extracted by decoding a low-resolution bitstream, or by extracting and displaying low-resolution content from the high-resolution compressed video, such as a few low-resolution I, P or B frames. The locations of key frames can be stored in a supplementary information file. This supplementary information file can be obtained by parsing video stream on-the-fly, or before hand. Considering the computation complexity and delays, in most cases having the information a priori would be best. Frame identifiers are gleaned from the bitstream or from storing similar information during a playback session. Information from the file is used to extract low-resolution content from these key frames.

Figure 4:
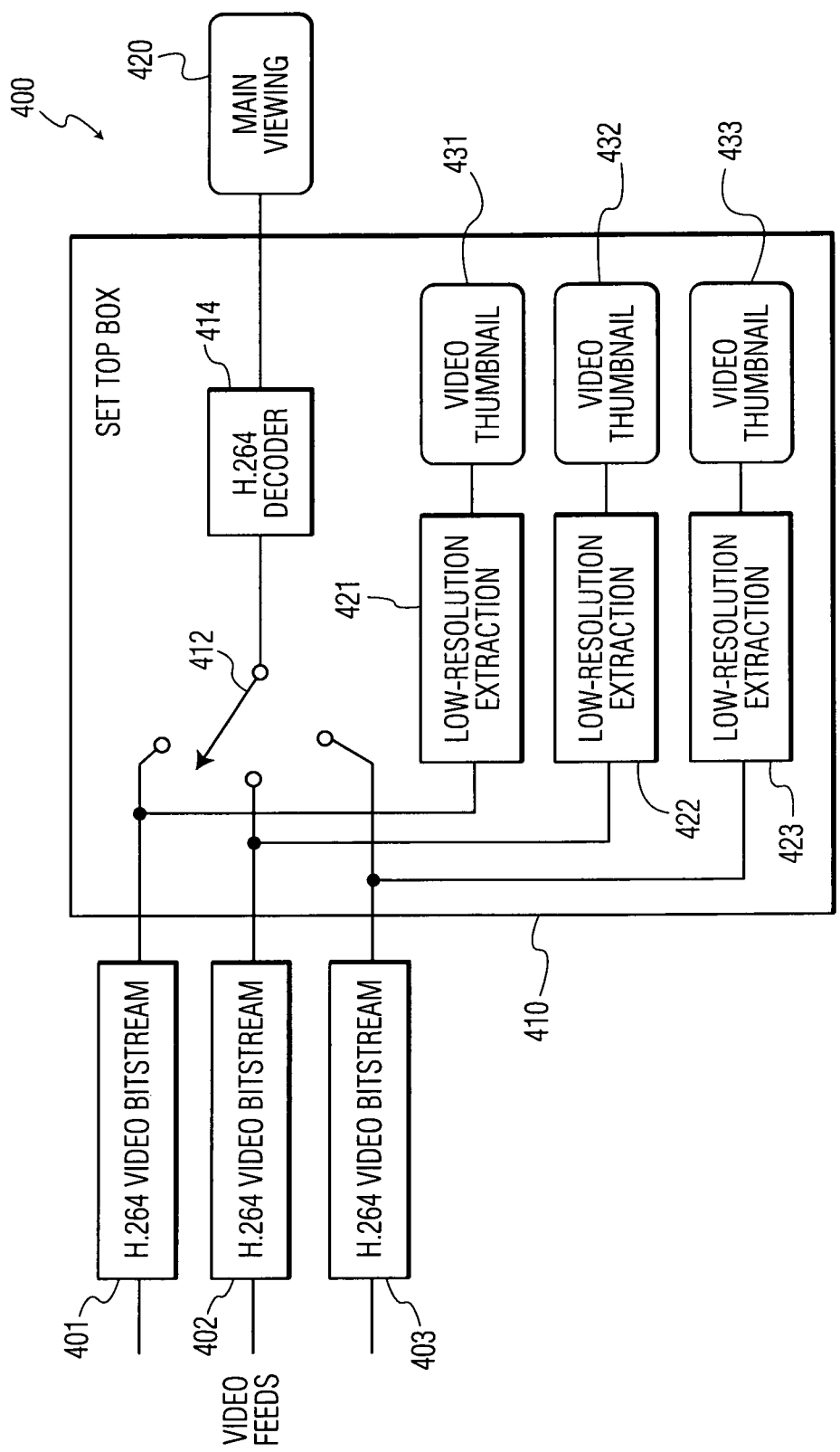
FIG. 4 represents a set top box embodiment in which several video thumbnails are displayed to a user to help with program selection.

FIG. 4 is a set top box embodiment 400. Several video feeds 401-403 are input to a tuner 410 with a program selector switch 412. An H.264 decoder decompresses the selected video bitstream for viewing by a user on a main viewer 420. Such a user is able to see which program interests them by low-resolution extraction units 421-423 that drive video thumbnails 431-433. The low-resolution extraction units 421-423 embody software and hardware similar to method 200 (FIG. 2) and decoder 300 (FIG. 3). The video thumbnails 431-433 can be presented in tandem on main viewer 420, each as a small picture-in-picture (PIP), or on a secondary video display.

Figure 5:
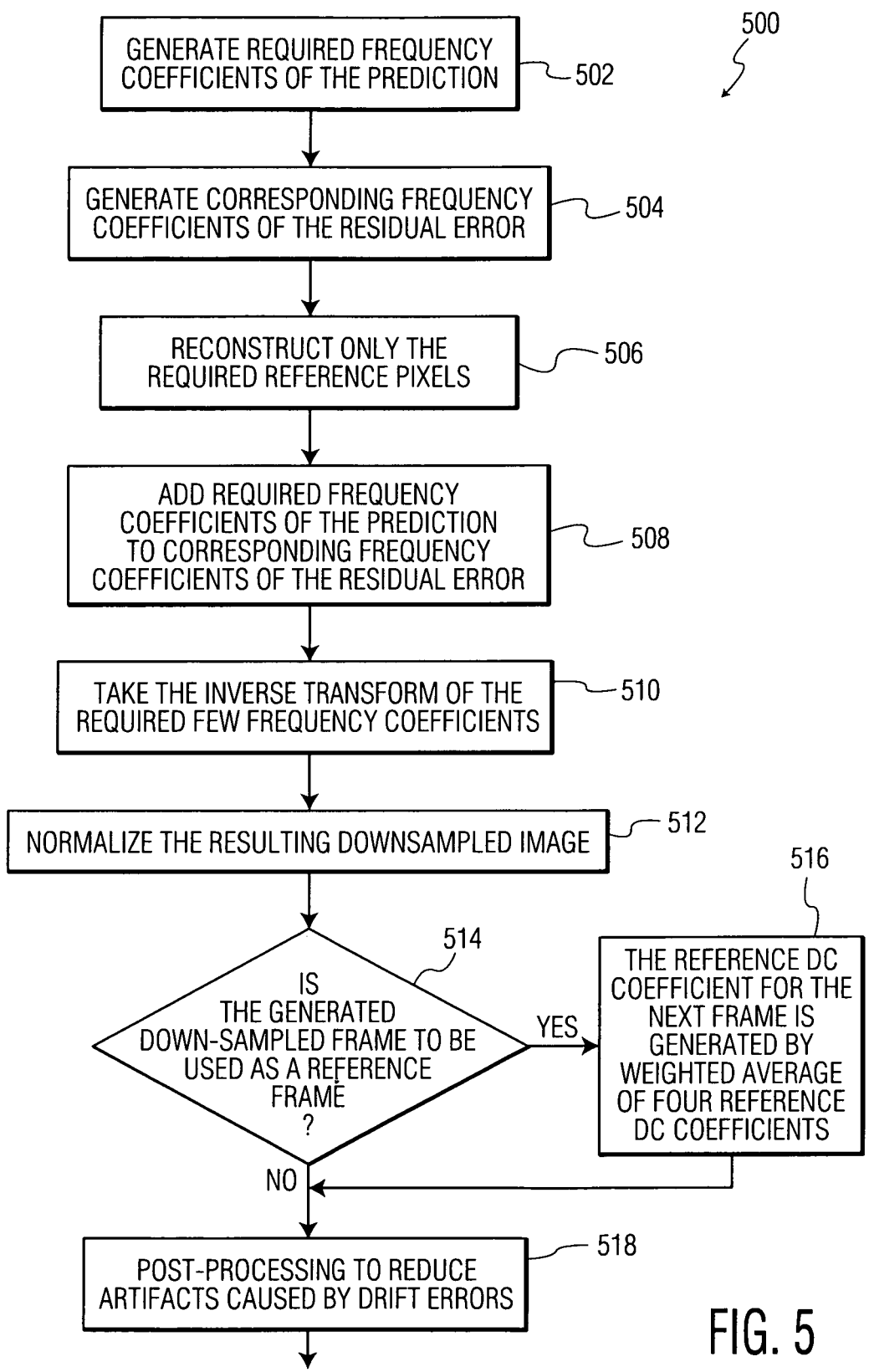
FIG. 5 represents a method embodiment for sub-sampling of Intra blocks.

FIG. 5 represents a method embodiment 500 for sub-sampling of Intra blocks. A step 502 is used to generate the frequency coefficients of the prediction needed. These frequency coefficients will be small in number, compared to the original number of frequency coefficients that would ordinarily be generated. A step 504 generates the corresponding frequency coefficients of the residual error. In a step 506, only those pixels of a particular block are reconstructed that will be used as reference pixels for decoding future blocks. In a step 508, the frequency coefficients of the prediction needed are added to the corresponding frequency coefficients of the residual error. In a step 510, the inverse transform of the frequency coefficients needed are taken, and will be very much reduced in number compared to the starting number of frequency coefficients. In a step 512, the resulting down-sampled image is normalized. In a step 514, if the down-sampled frame generated is to be used as a reference frame, then the reference DC coefficients for a next frame are generated in a step 516 by a weighted average of four reference DC coefficients. The DC coefficient of the reference block of the next frame is within the region covered by the four reference DC coefficients. Using down-sampled Intra frames as reference frames for Intra frame reconstruction will introduce drift errors which can either be tolerated, or their visual impact can be reduced in a post-processing step 518.

Figure 6:
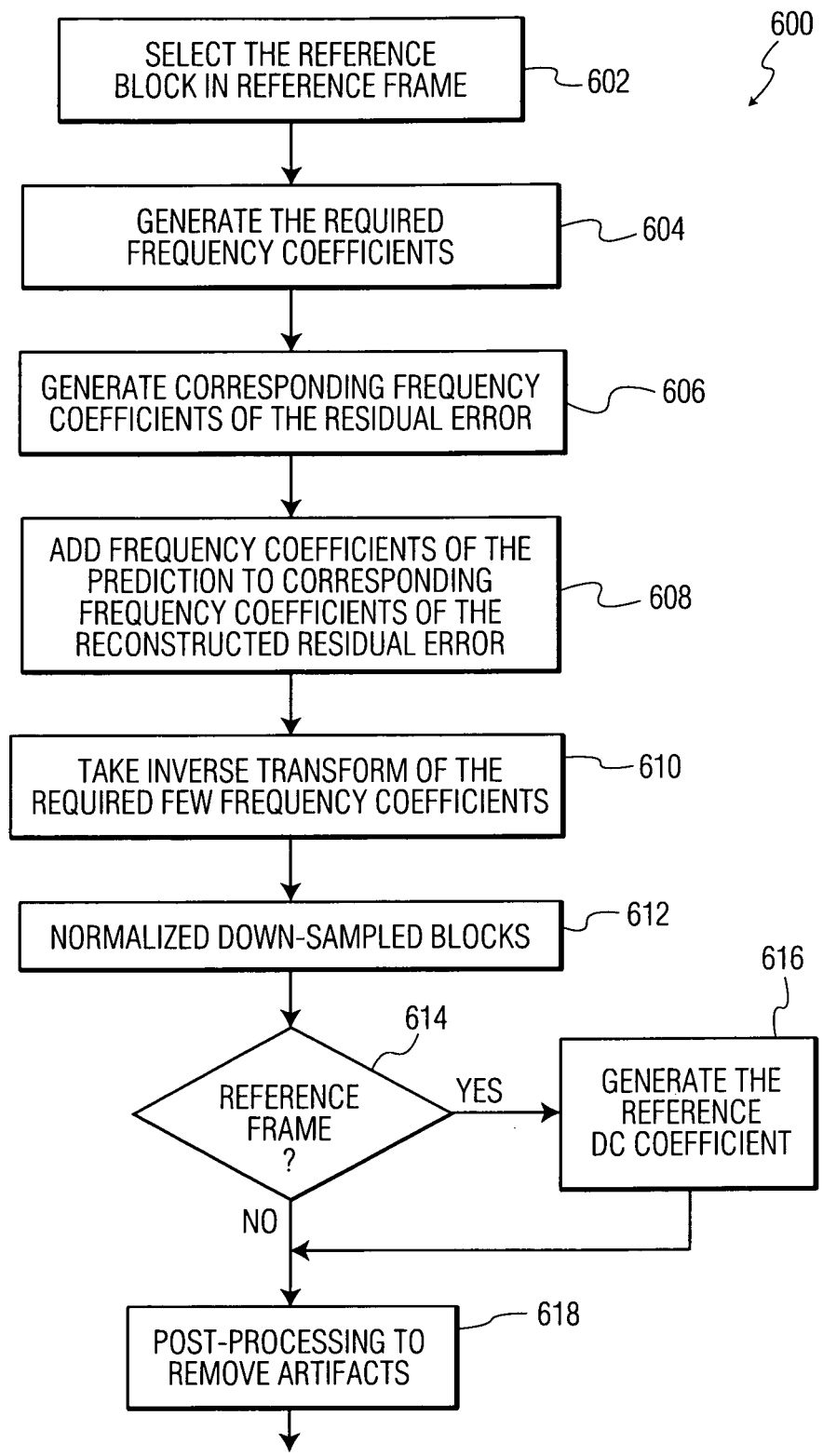
FIG. 6 represents a method for sub-sampling of Inter blocks.

FIG. 6 represents a method 600 for sub-sampling of the Inter blocks. In a step 602, the reference block selected in the reference frame is pointed to by the integer portion of the motion vector. The fractional part of the motion vector is disregarded, and frequency coefficients needed are generated in a step 604 from the selected reference block. The number of these frequency coefficients are small (1×1, 2×2) in number, compared to the original number. Having to generate a prediction for the fractional part of the motion vector adds a considerable computational load, so dropping the fractional part in the embodiments makes this sub-sampling relatively efficient. In a step 606, the corresponding frequency coefficients of the residual error are generated, where steps of generation are entropy decoding, inverse zigzag scan and inverse quantization. In a step 608, the frequency coefficients of the prediction needed are added to the corresponding frequency coefficients of the reconstructed residual error. The inverse transform of the needed few frequency coefficients is taken, in a step 610. These few frequency coefficients are small (1×1, 2×2) in number, as compared to the original number of frequency coefficients. A step 612 normalizes the resulting down-sampled block. The normalized down-sampled blocks together form a down-sampled image. In a step 614, if the down-sampled frame generated is to be used as a reference frame, then a reference DC coefficient for a next frame is generated from it in a step 616 using a weighted average of four reference DC coefficients. The DC coefficients of the reference block of the next frame will be within the region covered by these four reference DC coefficients. Using such down-sampled frames as reference frames will introduce drift errors. These drift errors can either be tolerated, or the visual impact of drift errors can be reduced by a post-processing step 618.

Figure 7:
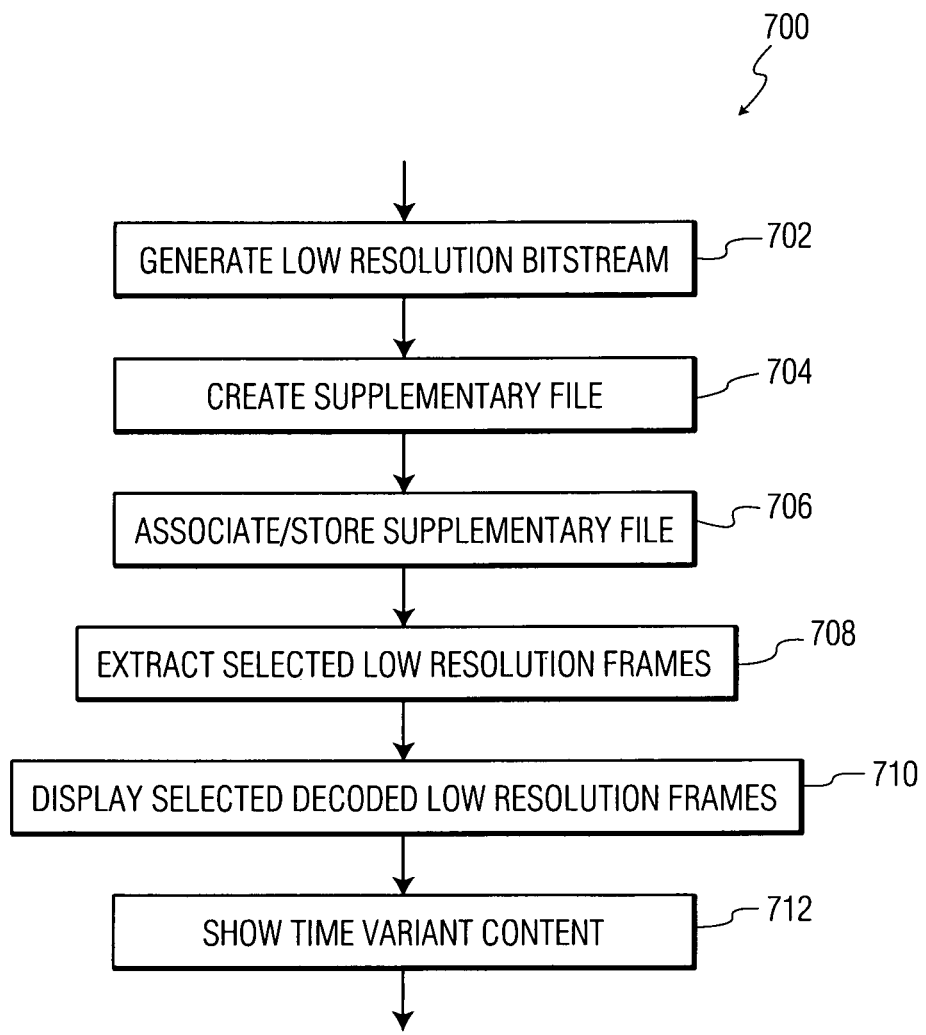
FIG. 7 represents a video thumbnail method embodiment.

FIG. 7 represents a video thumbnail method embodiment 700. Video thumbnails are time variant visual interfaces of smaller display size, as compared to the resolution of a main display device. This time variant visual interface is an interfacial representation of the underlying stored data. A low resolution video bitstream is generated in a step 702. Low-resolution video bitstreams can be used as supplementary video files for the corresponding high-resolution video bitstreams. In a step 704, supplementary information files can be used to index the location and other properties of key frames in video bitstreams, these other properties are frame display time, frame type etc. A step 706 associates and stores supplementary video and information files along with their corresponding video bitstreams. The supplementary files and high-resolution video bitstream are usually combined in a single container file format. Both the supplementary files and high-resolution video bitstream get encapsulated within a single container file format. A step 708 extracts the selected low-resolution frames from a high-resolution stored compressed video file. Frames to be decoded are either chosen on-the-fly from the high-resolution coded bitstream, or are indexed in a high-resolution coded bitstream with the help of supplementary information file. Frames can also be decoded from a corresponding low-resolution encoded video. When a user opens a video archive in a step 710, the computer system decodes the selected frames, and displays only low-resolution frames. The time variant content (frames) of one or more video files is simultaneously visually communicated to the user in a step 712.

In some situations, less than all of the top and left reference pixels may be available. A prediction mode may have to be chosen from a limited number of prediction modes, increasing the probability of choosing a simple prediction mode. If the prediction mode is simple, greater computation savings are realized.

The embodiments are beneficial when all the I-frames in a video sequence are being decoded, and when error resiliency features such as slices and slice groups are being used. These are important for wireless channels and networks that are prone to packet losses.

Decoding and reconstructing only a few samples results in computation savings. The I and B Frames are especially difficult to decode, so the embodiments are helpful in applications that require display of down-sampled frames. For example, in the Multimedia entertainment, Data Archiving and Medical Imaging industries, Set Top Boxes, entertainment, handheld devices, etc., and also in security applications in shopping malls, banks, airports etc., that require monitoring multiple inputs obtained from various cameras installed at different locations that require scaling before they can be shown. A video thumbnail is more appealing as compared to a static image thumbnail. DVDs/video archiving/video directory can have a video thumbnail as compared to a static thumbnail. A user may want to see multiple videos that are being streamed over the Internet, and want to choose between multiple broadcast programs, hence requiring simultaneous display of videos.

Some applications require encoding of complete video using only Intra frames. A master copy of the original video is generally coded as an all Intra frame encoded video sequence. The H.264 standard specifies all Intra Profile's that are targeted towards "New profiles for professional applications".

The embodiments described here have generally related to video frames represented in YUV/YCbCr color format, but alternative embodiments include RGB color and other formats. The most recent Intra Prediction Modes of H.264 video coding standard have been described, but future types of Intra prediction modes could no doubt be used with these techniques and methods.

Although specific embodiments have been described and illustrated, the embodiments are not to be limited to the specific forms or arrangements of parts as described and illustrated herein. The embodiments are limited only by the claims.

What is claimed is:

1. A device for extracting low resolution frames from high resolution compressed frames which have been encoded using predictive coding techniques, comprising:
   a device for generating frequency coefficients of a prediction needed, wherein the number of frequency coefficients are no more than N/2×N/2 and a fraction of the number in high resolution compressed Intra frames being sampled;
   a device for generating corresponding frequency coefficients of a residual error;
   a device for reconstructing only those pixels of a particular block that will be used as reference pixels for decoding future blocks;
   a device for adding the frequency coefficients of the prediction needed to corresponding frequency coefficients of the residual error;
   a device for taking an inverse transform of the sum of said frequency coefficients of prediction and said frequency coefficients of a reconstructed residual error;
   a device for normalizing the result of said inverse transform;
   a device for deciding if a down-sampled frame generated is to be used as a reference frame, then any reference DC coefficients for a next frame are generated by a weighted average of four reference DC coefficients, so the DC coefficient of the reference block of the next frame are within a region covered by the four reference DC coefficients, wherein, using down-sampled Intra frames as reference frames for Intra frame reconstruction introduces drift errors which are accepted;
   a video thumbnail device for generating a low resolution video bitstream for use as a supplementary video file for a corresponding high-resolution video bitstream;
   a device for generating supplementary information files to index locations and frame properties of key frames in video bitstreams;
   a device for associating and storing supplementary video files and supplementary information files along with their corresponding video bitstreams in a single container file format; and
   a device for extracting selected low-resolution frames from a high-resolution stored compressed video file, wherein frames to be decoded are either chosen on-the-fly from the high-resolution coded bitstream.

2. The device of claim 1, further comprising:
   a device for sub-sampling of Inter blocks in a predictive coding video bitstream;
   a device for using an integer portion of a motion vector to point to a reference block selected in a reference frame;
   a device for disregarding the fractional part of the motion vector;
   a device for generating frequency coefficients needed from a selected reference block, wherein, the number of these frequency coefficients are no more than N/2×N/2;
   a device for dropping a fractional part in sub-sampling to avoid the otherwise considerable computational load;
   a device for generating corresponding frequency coefficients of a residual error;
   a device for adding frequency coefficients of a prediction needed to corresponding frequency coefficients of a reconstructed residual error;
   a device for taking an inverse transform of only the few frequency coefficients needed; and
   a device for normalizing a resulting down-sampled block to form a down-sampled image.

3. The device of claim 1, further comprising:
   a device for deciding if any down-sampled frame generated is to be used as a reference frame later, then a reference DC coefficient for next frame is generated from it using a weighted average of four reference DC coefficients, and the DC coefficients of a reference block of a next frame will be within a region covered by said four reference DC coefficients.

4. The device of claim 1, further comprising:
   a device for decoding selected frames and displaying only selected decoded low-resolution frames for selected video bitstreams when a user opens a video archive.

5. The device of claim 1, further comprising:
   a device for visually communicating to a user simultaneous, motion picture content of a number of video files.

6. A device for extracting low resolution frames from high resolution compressed frames which have been encoded using predictive coding techniques, comprising:
   a device for generating frequency coefficients of a prediction needed, wherein the number of frequency coefficients are no more than N/2×N/2 and a fraction of the number in high resolution compressed Intra frames being sampled;
   a device for generating corresponding frequency coefficients of a residual error;
   a device for reconstructing only those pixels of a particular block that will be used as reference pixels for decoding future blocks;
   a device for adding the frequency coefficients of the prediction needed to corresponding frequency coefficients of the residual error;
   a device for taking an inverse transform of the sum of said frequency coefficients of prediction and said frequency coefficients of a reconstructed residual error;
   a device for normalizing the result of said inverse transform;
   a device for deciding if a down-sampled frame generated is to be used as a reference frame, then any reference DC coefficients for a next frame are generated by a weighted average of four reference DC coefficients, so the DC coefficient of the reference block of the next frame are within a region covered by the four reference DC coefficients, wherein, using down-sampled Intra frames as reference frames for Intra frame reconstruction introduces drift errors which are accepted;

a video thumbnail device for generating a low resolution video bitstream for use as a supplementary video file for a corresponding high-resolution video bitstream;

a device for generating supplementary information files to index locations and frame properties of key frames in video bitstreams;

a device for associating and storing supplementary video files and supplementary information files along with their corresponding video bitstreams in a single container file format; and a device for extracting selected low-resolution frames from a high-resolution stored compressed video file, wherein frames to be decoded are indexed in a high-resolution coded bitstream with the help of a supplementary information file.

7. A device for extracting low resolution frames from high resolution compressed frames which have been encoded using predictive coding techniques, comprising:

a device for generating frequency coefficients of a prediction needed, wherein the number of frequency coefficients are no more than N/2×N/2 and a fraction of the number in high resolution compressed Intra frames being sampled;

a device for generating corresponding frequency coefficients of a residual error;

a device for reconstructing only those pixels of a particular block that will be used as reference pixels for decoding future blocks;

a device for adding the frequency coefficients of the prediction needed to corresponding frequency coefficients of the residual error;

a device for taking an inverse transform of the sum of said frequency coefficients of prediction and said frequency coefficients of a reconstructed residual error;

a device for normalizing the result of said inverse transform;

a device for deciding if a down-sampled frame generated is to be used as a reference frame, then any reference DC coefficients for a next frame are generated by a weighted average of four reference DC coefficients, so the DC coefficient of the reference block of the next frame are within a region covered by the four reference DC coefficients, wherein, using down-sampled Intra frames as reference frames for Intra frame reconstruction introduces drift errors which are accepted;

a device for sampling a high-resolution compressed predictive/bi-predictive frame placed immediately before an Intra/ Intra Decoder Refresh (IDR) frame, and which will not be used later as a reference frame, and using it as a basis for generating a low resolution video;

a supplementary video file associated with a corresponding high-resolution video bitstream and providing an index of locations and frame properties of key frames; and a supplementary information file that indexes a high-resolution coded bitstream from a stored compressed video file so frames to be decoded can be chosen on-the-fly by a user.

* * * * *